Jan. 8, 1924.

E. E. KEYSER 1,480,450

ICE HARVESTING MACHINE

Filed May 8, 1922

Inventor
Elmer E. Keyser

By
[signature]
Attorney

Jan. 8, 1924.                                                                1,480,450
E. E. KEYSER
ICE HARVESTING MACHINE
Filed May 8, 1922                          4 Sheets-Sheet 3
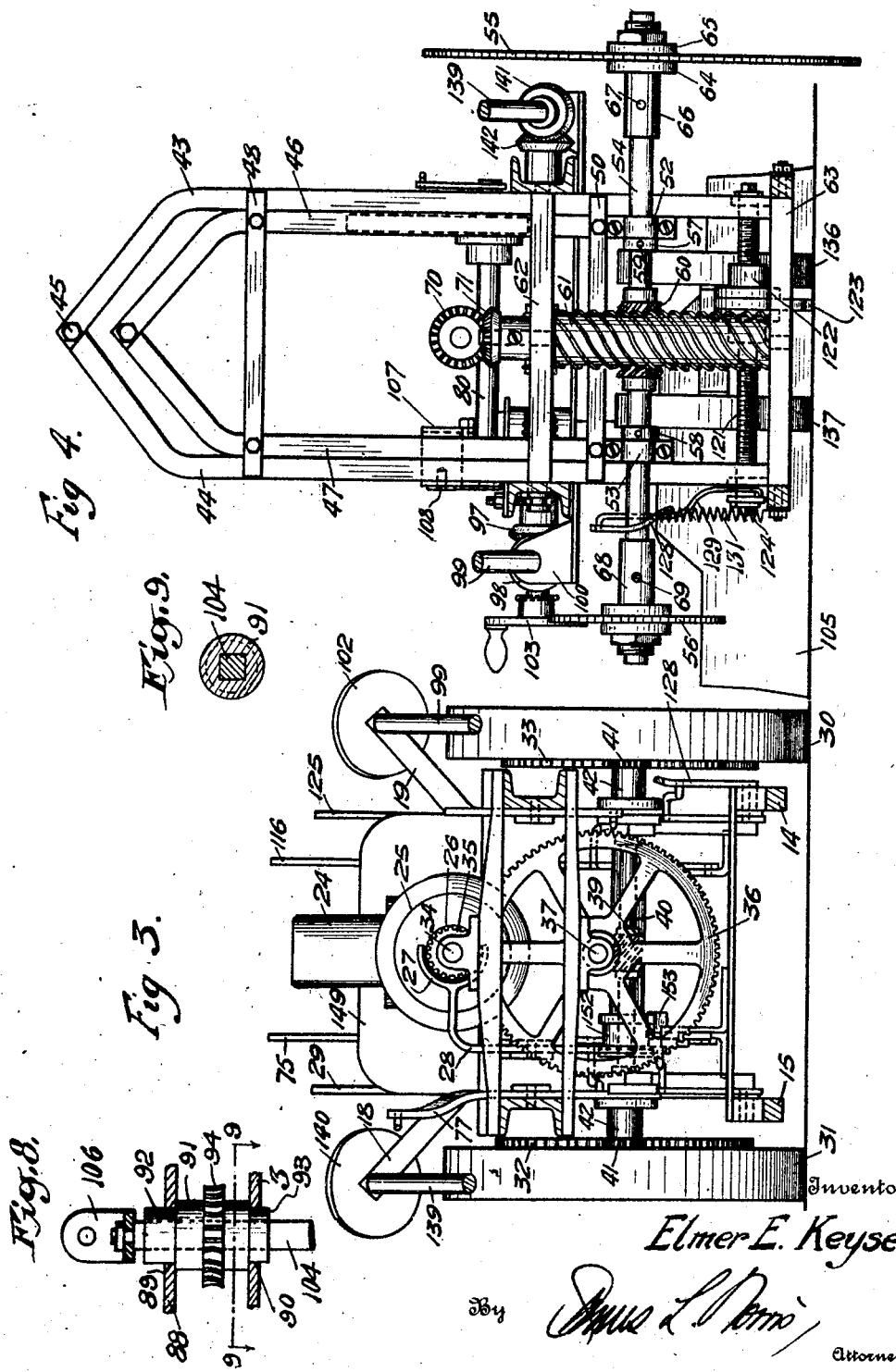
Inventor
Elmer E. Keyser
By
Attorney Jan. 8, 1924.

E. E. KEYSER 1,480,450

ICE HARVESTING MACHINE

Filed May 8, 1922

Inventor
Elmer E. Keyser
By
Attorney

Patented Jan. 8, 1924.

1,480,450

UNITED STATES PATENT OFFICE.

ELMER E. KEYSER, OF SIOUX CITY, IOWA.

ICE-HARVESTING MACHINE.

Application filed May 8, 1922. Serial No. 559,269.

*To all whom it may concern:*

Be it known that I, ELMER E. KEYSER, a citizen of the United States, residing at Sioux City, in the county of Woodbury and State of Iowa, have invented new and useful Improvements in Ice-Harvesting Machines, of which the following is a specification.

This invention relates to ice harvesting machines and proposes the construction of a self-propelled vehicle provided with the necessary devices for performing simultaneously, and in a single operation all the steps involved in the harvesting of ice, including scraping of the surface of the ice-field, marking, scoring and cutting the ice. The improved machine of my invention eliminates, in a great measure, the time and labor costs attending the usual method of ice harvesting which necessitates the employment of teams, ice markers, plows and inevitably, a great deal of hand sawing.

By my improved ice harvesting machine no manual or team performed employment is necessary from the commencement of the operation to when the strips of ice are broken into individual blocks.

One of the objects of my invention is the provision of a vehicle carrying a prime mover, preferably in the form of an internal combustion engine power plant, and a circular saw carrying mandrel, with means connecting the power plant to the traction wheels and to the mandrel so that both said wheels and mandrel may be simultaneously driven by said power plant, or independently operated selectively thereby.

Another object of the invention is the provision of a pair of saws on said mandrel, with means for relatively adjusting the distance between said saws to vary the width of the strip of ice to be cut, in combination with a guide adapted to fit into a saw kerf made in the ice by one of said saws, to guide the machine in parallelism with said saw kerf, said guide being laterally shiftable to accommodate itself to variations in the width of the strip of ice to be cut, this width being determined by the adjustable spacing apart of said saws.

Another object of the invention is the provision, on a power driven mandrel of a pair of spaced saws of different size, the larger saw being adapted to cut all the way through the ice while the other saw scores a groove in the ice at a fixed distance from the larger saw for the travel of the guide, and through which the larger saw will presently follow.

Still another object of the invention is to provide means for raising and lowering the saws so that one or both saws may be relieved altogether from engagement with the ice, and to provide for making any depth of cut desired, with the larger saw.

A further object of the invention is to provide means for raising the guide from the saw kerf in the ice, when desired, said means operating automatically when the saws are lifted from the ice, to ensure that the guide will not remain in the ice for a length of time when the machine is not in use, and thereby become immovably frozen in the ice.

A still further object of the invention is the construction of a snow and ice scraper on the front of the machine, which is reciprocable so as to be elevated or depressed relative to the ice, and pivotally mounted to permit angular adjustment, said scraper being provided with control means for effecting both the reciprocable and pivotal movements of said scraper, one of said control means being located at a point on the machine remote from the scraper and duplicated at a point adjacent thereto.

Another object of the invention relates to the drive shaft for the tractor wheels, and consists in reversible hubs on the ends of the drive shafts having a geared portion and a smooth portion of smaller diameter than said geared portion, either portion being capable of selective arrangement in adjacency to the gears on the traction wheels by manually reversing said hubs, to convert the machine from a self-propelled to a team drawn vehicle.

A still further object of the invention is the provision of the guide, loosely mounted on a screw threaded shaft, and normally depressed by gravity into contact with the ice, said shaft being rotatable so that when the guide is held against longitudinal movement with respect to said shaft by being confined within the saw kerf in the ice, it is lifted by the rotary movement of said shaft, and when said guide is not confined in said saw kerf, it is longitudinally shiftable with respect to said shaft by rotary motion of the latter.

With the above and other objects in view, my invention consists in the improved ice harvesting machine illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:

Figure 2 is a plan view of the same.

Figures 3 and 4 are cross sectional views taken along the line 3—3 of Figure 2 viewed respectively toward the left and toward the right.

Figure 8 is a detail view showing the swivel connection between the scraper-carrying rod and the lifting mechanism therefor, and also showing the turning mechanism for driving the scraper rod.

Figure 9 is a cross-section on the line 9—9, Figure 8, showing the relation between the sleeve and the scraper-carrying rod.

Figure 1:
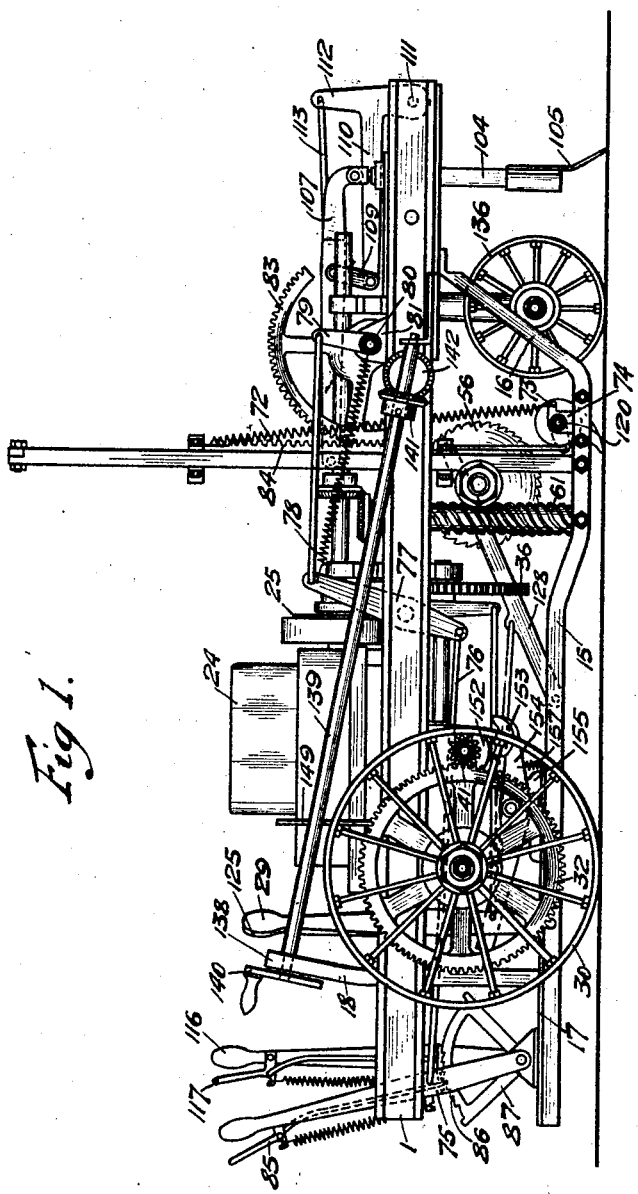
Figure 1 is a side elevation of my improved ice harvesting machine.

Referring in detail to the several figures the reference characters 1 and 2 represent two spaced channel bars running longitudinally of the machine and constituting the main members of the frame work thereof. These members are connected at their forward ends by a plate 3 which is apertured at 4 for the reception of a vertical post 5 forming a support for the front axle 6. The lower end of said post is transversely bifurcated by means of the slot 7 within which is loosely housed said front axle which is pivotally secured to said post by a pin 8 passing through said bifurcated end at right angles to said slot. By this construction the front axle is permitted to freely rock when passing over an uneven surface. The front steering wheels 136 and 137 are carried at opposite ends of the front axle. The channel bars 1 and 2 are each provided toward the rear with vertically depending plates 9 and 10, respectively, which afford supports for the rear axle 11. Said supports are indented, as shown at 12, from the lower edge forming a seat for said axle the latter being rigidly secured in position by means of the nuts 13. Should it at any time be necessary to remove the rear axle, this is accomplished by jacking up the rear of the machine, removing the wheels and dropping the rear axle through said indentations. Depending from the main frame members 1 and 2 are the sub-frame elements 14 and 15, said sub-frame elements being secured to the main frame members forwardly by means of the upturned portions 16, and connected at their rearward portions by means of a substantial metallic plate 17, the latter forming a platform for the operator of the vehicle. Said platform and the rear portions of the sub-frame elements are supported from the main frame members by the uprights 18 and 19.

The upright 18 is bent outwardly at its upper end forming a bracket 138 in which is journalled an operating shaft 139 carrying at its rearward end a hand wheel 140 by which said operating shaft is turned, and provided adjacent its lower end with a beveled gear 141 meshing with a similar gear 142 on a shaft 143, journalled in the webs of the main frame members 1 and 2 and carrying a worm 144 which meshes with a horizontal wheel 145 having a portion of the circumference thereof provided with gear teeth 146 as shown in Figure 2, by means of which said wheel is rotated through a considerable angle in either direction. The wheel 145 is provided with an apertured hub 147 which fixedly engages the upper end of the post 5, and by which means said post is turned in the steering of the vehicle. The lower end of the operating shaft 139 is journalled in the bracket 148.

The engine bed, constituted by the transverse bars 20 and 21 and the longitudinal sleepers 22 and 23, is carried by the upper sides of the main frame members and supports an internal combustion engine power plant 24. The dash-board 149 is supported uprightly from the engine bed, and by means of a transverse support 150 carried by the main frame members, and serves as a means for mounting the usual indicating devices and the coils (not shown) for controlling the ignition of the engine. Said power plant comprises the selective gear transmission mechanism including reverse, not shown, but common to practically all unitary automobile power plants, and the cone clutch 25 which is provided with a grooved collar 26 travelling within the ends of, and engaged by the arms of a yoke 27, connected to a clutch operating rod 28 which terminates in a clutch lever 29, best shown in Figure 2. The clutch operating lever 29 is locked in position of clutch release by means of the pivoted latch 151 the end of which may be depressed to lie in the path of movement of said lever as shown in Figure 2. The latch 151 is a duplicate as to structure of the latch 158 shown in Figure 5.

The traction wheels 30 and 31 are rotatably secured to the opposite ends of the rear axle, each being provided with a ring gear 32 and 33, respectively, by which said traction wheels are driven from the power plant by means of a train of mechanism including the propeller shaft 34 to which is fixed the gear 35 which meshes with the large gear 36, the latter being carried by a lay shaft 37 upon which is mounted a worm 38.

The worm 38 engages with a complementary worm 39 which is fixedly secured upon the jack shaft 40. The latter is provided at its opposite ends with reversible hubs carrying a geared portion 41 of larger diameter and a smooth portion 42 of smaller diameter. When said hubs are placed with the geared portion outward they are in mesh with the gears 32 and 33 on the traction wheels. When they are placed with the smooth portion outward the power plant is then disconnected from the traction wheels and the machine may be drawn by a team of horses. It will be understood, of course, that the power plant may be disconnected from the traction wheels by means of the cone clutch 25, but the reversible hubs are provided to relieve the draft, of the friction of the intermediate mechanism between said wheels and the power plant when the machine is drawn by a team. The reversible hubs also permit the power to be applied altogether through one wheel if desired.

The propeller shaft 34 and the lay shaft 37 are journalled in suitable bearings carried by transverse supports secured between the main frame members. The jack shaft 40 is provided with a brake drum 152 which is engageable by a brake shoe 153 on one end of a rocking lever 154 which is pivotally supported from a bracket 155 bolted to the platform 17. The opposite end of this rocking lever is formed into a foot pedal 156, as shown in Figure 2, by pressure upon which the brake shoe is applied to the brake drum. A spring 157 normally holds said brake in position of release.

Vertically supported by the frame members 1 and 2 and the sub-frame elements 14 and 15 is a stationary track constituted by two side members 43 and 44, spaced apart but coming together at the top where they are joined by means of the bolt 45. Within this track slides a vertically reciprocable carriage formed of side bars 46 and 47 which come together at the top and are joined in a manner similar to the stationary track. This carriage is held against displacement transversely of the plane of the members 43—44 by means of the cross pieces 48 and 49 near its upper end, and 50 and 51 near its lower end, said cross pieces being spaced apart and slidably engaging the opposite faces of the side bars 43 and 44 of the stationary track.

Figure 5:
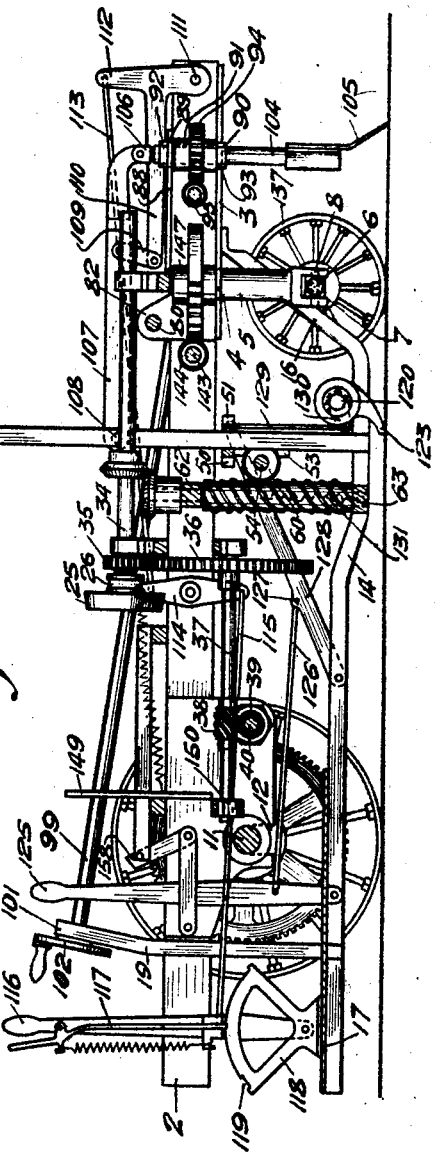
Figure 5 is a sectional side elevation, taken along the line 5—5 of Figure 2.

Bearings 52 and 53 are secured to the lower ends of the sliding carriage as best shown in Figures 4 and 5, in which is journalled the mandrel 54 which carries at its opposite ends the circular saws 55 and 56. Said mandrel is prevented from shifting relative to its bearings by the collars 57 and 58 which are immovably secured to said mandrel by means of the pins 59 and between said collars the mandrel is provided with a worm 60 which meshes with a vertically mounted worm drum 61. This worm drum is journalled in bearings in the upper and lower cross bars 62 and 63 and is of sufficient length to maintain its operative relation with the worm 60 throughout the range of reciprocable movement of said sliding carriage.

The saw 55 is larger in diameter than the saw 56 and is rigidly secured to the mandrel 54 by being clamped between the fixed and movable flanges 64 and 65 respectively of a sleeve 66, said sleeve is rigidly held to the mandrel by means of the pin 67. The small saw 56 is similarly fixed to a sleeve 68, but the latter is slidable with respect to the mandrel and is securable in any position of spaced relation within the limits of its range of slidable movement by means of the set screw 69. The space between the saws 55 and 56 represents the width of two or more strips of ice and the width of a strip is determined by the position of adjustment of the small saw 56.

The mandrel 54 is driven from the power plant through the train of gearing including the propeller shaft 34, the bevel gears 70 and 71, the worm drum 61 and the worm 60.

The sliding carriage is normally pressed downwardly through the tension of the spiral springs 72, of which there are two, one on each side, said springs being secured at their upper ends to said carriage and at their lower ends to a fixed point on the machine, here represented by the projecting end 73, Figure 1, of the bracket 74. The sliding carriage is elevated by means controlled by the operator from the platform 17, said means comprising a hand lever 75 which is connected by a link 76 to a rocking lever 77 pivotally supported on the main frame member 1 and carrying at its upper end a link 78 which is connected to the upper end of an arm 79 rigidly secured to a transverse shaft 80 which is carried in brackets 81 and 82 mounted on the main frame members. Rigidly keyed to said shaft is a toothed sector 83 which is in engagement with a toothed rack 84 attached to one side of the sliding carriage. When the lever 75 is moved in one direction the sector 83 oscillates so as to depress the sliding carriage, and when said lever is moved in an opposite direction said sector oscillates in such a way as to elevate said carriage. The amount of elevation or depression of the sliding carriage, and consequently the depth relation of the saws to the ice are determined by a spring pressed detent 85 which is arranged to engage any one of the depressions 86 in the sector 87 which is supported from the sub-frame element 14. Said depressions are arranged so as to determine a given position of the sliding carriage relative to the surface of the ice.

A horizontal plate 88, Figure 2, is secured to the front end of the main frame member 2 and projects inwardly, being provided with an aperture 89 which is in alignment with a similar aperture 90, Figure 5, provided in the plate 3. A sleeve 91 is retained between the plates 88 and 3, in register with said apertures and having portions 92 and 93 of reduced diameter at its opposite ends passing through said apertures and being journalled therein. A worm gear 94 keyed to the sleeve 91 intermediate the ends of the latter meshes with a worm 95 on a shaft 96, said shaft being journalled in apertures in the webs of the main frame members 1 and 2 and projecting outwardly beyond the latter frame member. The projecting portion carries a bevel gear 97 which meshes with a corresponding gear 98 on the end of an operating shaft 99 which is journalled at its opposite ends in brackets 100 and 101 the latter being constituted by the outwardly bent end of the upright 19. The outer end of the operating shaft 99 carries a hand wheel 102 within convenient reach of the operator of the vehicle when standing on the platform 17 and another hand wheel 103 is carried directly by the shaft 96, which may be actuated by said operator when he is standing by the scraper.

The sleeve 91 is provided with a bore of polygonal cross section within which reciprocates the squared rod 104 which is rigidly secured to the scraper blade 105. The upper end of said squared rod is provided with a swivel yoke 106 rotatably secured in the upper end of said squared rod and pivotally connected to one end of an arm 107 the other end of which is pivotally supported at 108 upon the side 44 of the vertical track. The arm 107 is connected intermediate its ends by means of the link 109 with one end 110 of a bell crank lever which is pivotally mounted at 111 to a main frame member 2 and is provided with an upstanding arm 112 connected by means of a link 113 with a rocking lever 114 pivotally supported upon said main frame member and connected at its opposite end by means of the link 115, with the operating lever 116. The latter is provided with the detent 117 which engages a sector 118 having a depression 119. By moving the lever 116 in a forward direction the arm 112 of the bell crank lever is pulled rearwardly depressing the end of the arm 110 which is connected to the arm 107, pulling down the latter and lowering the squared rod 104 through the sleeve 91 so as to put the scraper in engagement with the surface of the ice. When the lever 116 is drawn to the rear the arm 110 of the bell-crank lever is lifted raising the arm 107 and elevating the scraper. The engagement of the detent 117 with the depression 119 of the sector locks the scraper in elevated position. The swivel joint formed between the yoke 106 and the squared stem 104 permits pivotal adjustment of the scraper without interfering with its function of reciprocation.

A shaft 120 is rotatably supported transversely of the ice harvesting machine in bearings formed in brackets 74 which are carried by the sub-frame members 14 and 15. This shaft is formed with a heavy screw thread 121 throughout its length which is loosely engaged by the threaded bore of a guide member 122, the latter comprising a tubular portion having the projecting guide 123 rigidly secured thereto which normally makes contact with the ground through the force of gravity After one saw kerf has been made in the ice the ice cutting machine is intended to be moved into such a position that the guide 123 drops into said saw kerf and maintains the machine in a parallel course while another saw kerf is being scored in the surface of the ice by either the large or small saw, depending upon the manner in which the machine is being operated. As hereinbefore explained, the small saw 56 is adjustable along the mandrel 54. When the width between successive cuts is therefore varied by slidably adjusting the small saw, the guide 123 must also be transversely adjustable so that it may be arranged to fall into one saw kerf, for guiding the machine while the large saw is traveling in one of the saw kerfs made by the small saw as will presently be described in narrating the procedure followed in operating the machine. In order to shift the guide 123 transversely the threaded shaft 120 is made squared at one end as shown at 124 for the reception of a hand crank or other device by which said shaft is turned. By the rotation of said shaft the guide 123 travels along the screw thread 102 in either direction according to which way said shaft is turned. It is likewise essential that means be provided for lifting the guide from the saw kerf in which it may be travelling, in order to move the machine before another cut is attempted. This is accomplished automatically by the screw thread. When the guide is in the saw kerf said screw thread functions in a manner quite different from its operation when the guide is free upon the surface of the ice. In the latter case as has been just observed, rotation of the shaft will cause said guide to travel transversely relative to said screw thread, but when held against transverse movement by the sides of the saw kerf it will be lifted by the rotation of said shaft. This lifting movement is always aided by untoward conditions of environment respecting said guide and screw threaded shaft, as when congealed oil, or ice frozen to said shaft or guide, increases the frictional resistance between said threaded guide member and threaded shaft. Such conditions ensure the certainty of elevating said guide from said saw kerf.

For the purpose of lifting the guide from the saw kerf means are provided for giving the shaft 120 a partial rotation. These means consist of a lever 125 pivotally secured to the sub-frame element 15 and connected by a link 126 to an intermediate point 127 on a second lever 128 the opposite end of which is connected by a link 129 to an arm 130 the latter being detachably locked to the shaft 120. When the lever 125 is pulled rearwardly the lever 128 is raised elevating the arm 130 and raising the guide out of the saw kerf. When the lever 125 is permitted to move forwardly the shaft is rotated back to its original position and the guide permitted to drop. A spring 131 normally holds the shaft 120 in the position in which the guide 123 is depressed. The latch 158, which is similar to the locking means 151 associated with the lever 29 is depressible into the path of movement of the lever 125 so as to hold the guide in elevated position.

Figure 6:
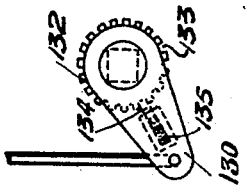
Figure 6 is a detail view showing the releasable operating connections for the guide shaft.

The reason for providing detachable locking means between the arm 130 and the shaft 120 is to permit the former to be released from said shaft so that the latter may be independently turned by the crank or other means hereinbefore mentioned, for the purpose of moving the guide transversely of said shaft when the width between successive cuts in the ice has been changed by altering the position of the small saw on the mandrel 54. This detachable locking means shown in detail in Figure 6 comprises a flange 132 keyed or otherwise rigidly secured to the shaft 120 and carrying a plurality of depressions 133 in its periphery which are engaged by a slide 134, which is secured to the arm 130 and normally pressed into engagement with said flange by means of the spring 135. While said parts are in engagement the arm 130 and shaft 120 move as a rigid member, but by withdrawing the slide from the depressions 133 said shaft may be rotated by the hand crank independently of the lifting mechanism.

The mandrel 54 extends beneath the arm 128 as shown in Figure 4 so that when the sliding carriage is raised to its uppermost position, as when the saws are lifted clear of the ice said mandrel will engage the under surface of the arm 128 and raise the same lifting the guide 123 from the saw kerf in which it may be confined. This ensures that when the machine is not to be operated for some time, the guide will not be left in its depressed position where it may become immovably frozen in the ice.

Figure 7:
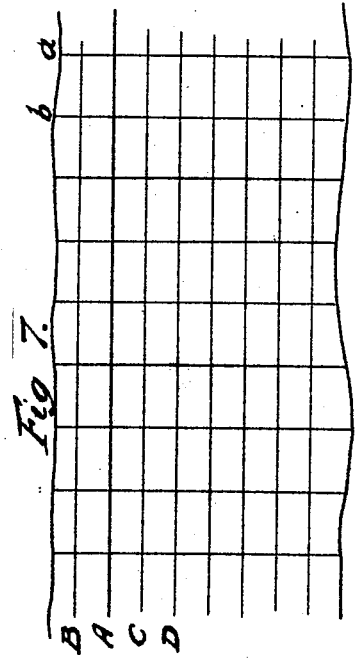
Figure 7 is a diagrammatic view of a portion of an ice-field illustrating the operation of the machine.

The operation of the several sets of mechanism has been sufficiently outlined in connection with the description of the construction of the various parts. The ice harvesting machine, as a whole, is operated by first running it cross-wise on the ice-field in one direction, making an initial cut which is represented by the character $a$ in Figure 7. This, and all successive cross cuts are made with the large saw, and their depth is determined by the thickness of the ice. The cut is never so deep, however, as to cut clear through the ice, being of sufficient depth only to enable the strips of ice to be readily broken apart into blocks, as they are drawn from the water. After making the cut $a$, the machine is then turned and run back over the ice in the opposite direction forming the cut $b$. During the cross-cutting of the ice field the small saw is elevated and out of operation. The length of a block of ice, that is to say the width between the adjacent cuts is determined by the position of the guide 123 during the act of cross-cutting. When the machine is run back across the ice to make the cut $b$ the guide 123 travels in the cut $a$. At the end of the cut $b$ the saw and guide are elevated and the machine thrown in reverse, travelling back toward the edge of the ice-field at which the cut $b$ was started. All the transverse saw cuts are started from the same edge of the ice-field. When the cross cutting has been completed, the machine is started at the left end of the longitudinal line A. Here, as in the cross cutting the large saw is the only one in operation and it is set to cut a kerf shallower than the thickness of the ice. This initial cut must be made with the greatest of care and rectitude, as uniformity in width of the strips, and the facility in cutting the same depends upon the care with which this cut is made. The saw is then raised, the machine run to the point of beginning, but advanced over the cut A until the larger saw is at B, a distance of one strip beyond the cut A. The guide is then permitted to drop into saw kerf A, the saws are depressed until the large saw is in a position to cut clear through the ice, the small saw being set to cut the shallow guiding kerf C. The machine is then run towards the right, the large saw cutting clear through the ice along the line B and the small saw making the guide kerf C. When this has been completed the saws and guide are raised, the machine reversed, and carried back to the point of beginning. The large saw is then let down in the saw kerf A, and the guide dropped into the saw kerf C. When the machine is run, the large saw will cut clear through the line A, and the small saw will make a new guiding cut along the line D. In this way the entire field of ice is sawn into longitudinal strips each of which is scored across at the proper intervals by the transverse cuts. During this operation the snow which may be on the surface of the ice or the ice chips produced by the saws are scraped from the path of travel of the machine by the scraper blade 105.

Having described my invention what I claim as new and desire to secure by Letters Patent, is:—

1. An ice harvesting machine comprising a portable frame, a vertical track secured to said frame, a sliding carriage guided by said track for vertical reciprocation, a horizontal mandrel journalled in bearings secured to said carriage, a saw carried by said mandrel, adapted to cut a groove in the surface of an ice-field, a shaft journalled in said frame in parallelism to said mandrel, said shaft being externally screw threaded, a guide having a screw threaded bore engaging the threaded portion of said shaft, said guide being normally depressible into the groove cut in the ice-field by said saw, said guide being lifted when confined within the sides of said groove by rotation of said shaft and transversely shiftable by rotation of said shaft when not so confined.

2. An ice harvesting machine comprising a portable frame, a vertical track secured to said frame, a sliding carriage guided by said track for vertical reciprocation, a horizontal mandrel journalled in bearings secured to said carriage, a saw carried by said mandrel, adapted to cut a groove in the surface of an ice-field, a shaft journalled in said frame in parallelism to said mandrel, said shaft being externally screw threaded, a guide having a screw threaded bore engaging the threaded portion of said shaft, said guide being normally depressible into the groove cut in the ice-field by said saw, said guide being lifted when confined within the sides of said groove by rotation of said shaft and transversely shiftable by rotation of said shaft when not so confined, means for giving said shaft a partial rotation to raise said guide and means for detaching said rotating means from said shaft to permit independent rotation of the latter.

3. An ice harvesting machine comprising a portable frame, a vertical track secured to said frame, a sliding carriage guided by said track for vertical reciprocation, means for elevating said carriage, a horizontal mandrel journalled in bearings secured to said carriage, a saw carried by said mandrel adapted to cut a groove in the surface of an ice field, a shaft journalled in said frame in parallelism to said mandrel, said shaft being externally screw threaded for a portion of its length, a guide having a threaded bore engaging the screw threaded portion of said shaft, said guide being normally depressible into the groove cut in the ice-field by said saw, said guide being lifted, when confined within the sides of said groove, by rotation of said shaft and transversely shiftable by rotation of said shaft when not so confined, means for rotating said shaft, to elevate said guide, means for detaching said rotating means from said shaft to permit independent rotation, of the latter, and means for elevating said carriage to cause said mandrel to engage said guide lifting means when said carriage is elevated to its uppermost position.

4. An ice-harvesting machine comprising a frame, a scraper positioned forwardly of said frame and adapted to contact with the surface of an ice-field, a pair of operating means for angularly displacing said scraper about a vertical axis, said pair of operating means extending substantially at a right angle to one another and operable, respectively, from a point adjacent the operator's platform remote from said scraper and at a point adjacent the scraper.

5. An ice-harvesting machine comprising a portable frame, a horizontal mandrel carried transversely thereof, a circular saw on said mandrel, means for vertically elevating and depressing said mandrel, a guide shaft mounted in said frame in parallelism to said mandrel, a guide on said shaft depressible into a groove in the ice and lifted therefrom by rotation of said shaft, means for rotating said guide shaft, said means being engageable by said mandrel when the latter is elevated to its uppermost position, to lift said guide.

In testimony whereof I have hereunto set my hand in presence of two subscribing witnesses.

ELMER E. KEYSER.

Witnesses:
CHARLES M. FEIST,
DOROTHY DE BEER.